Dec. 29, 1964    J. D. SCOTT    3,163,007
POWER BRAKE CONTROL VALVE
Original Filed Nov. 30, 1961
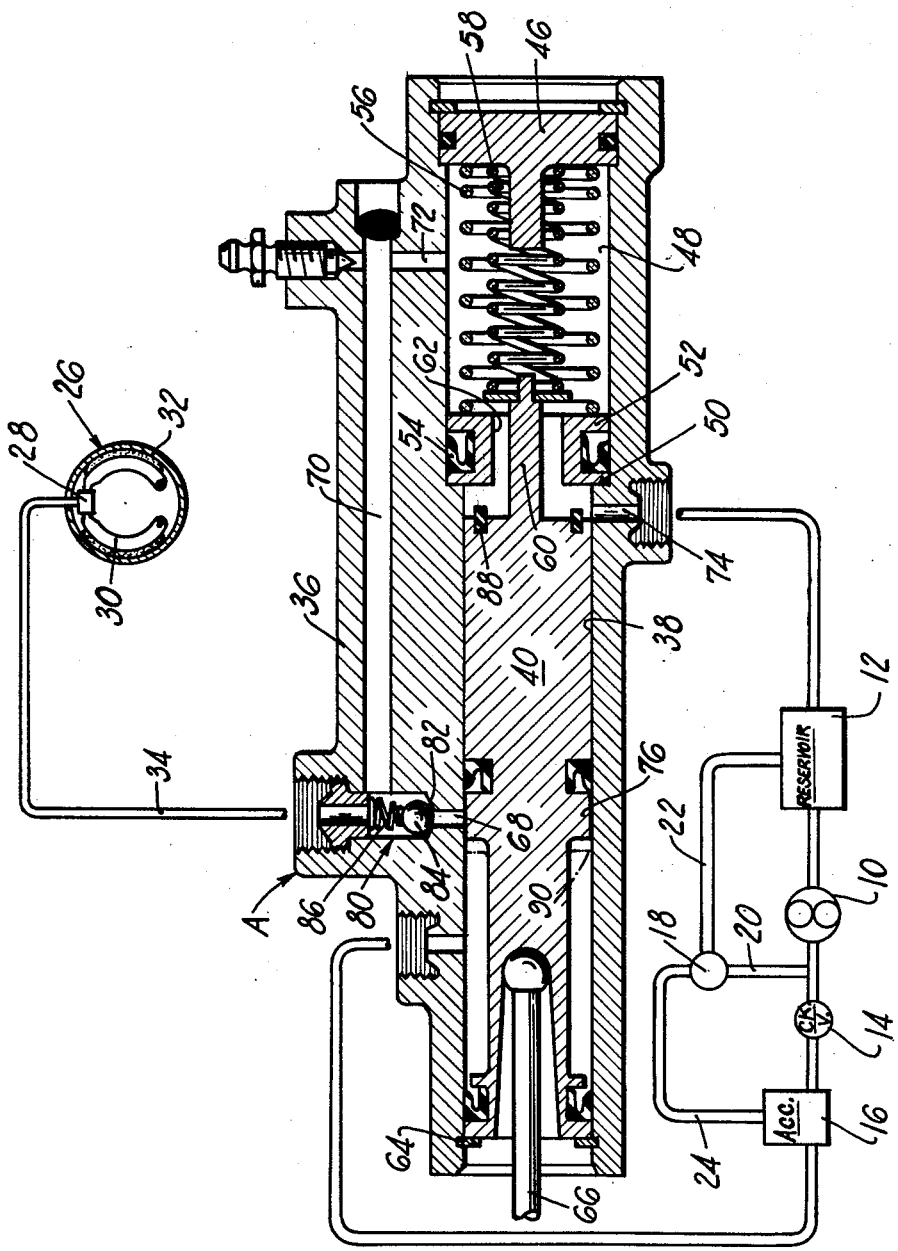
INVENTOR.
JOHN D. SCOTT
BY
*William P. Hickey*
ATTORNEY United States Patent Office 3,163,007
Patented Dec. 29, 1964

3,163,007
POWER BRAKE CONTROL VALVE
John D. Scott, South Bend, Ind., assignor to The Bendix Corporation, South Bend, Ind., a corporation of Delaware
Continuation of application Ser. No. 156,115, Nov. 30, 1961. This application Jan. 4, 1963, Ser. No. 249,523
3 Claims. (Cl. 60—54.5)

The present invention relates to a fluid pressure control valve whose control member can not only modulate a pressure fluid flow therethrough, but can physically displace fluid to its output port; and more particularly to a power brake control valve incorporating these features. This application is a continuation of U.S. application Serial No. 156,115.

An object of the present invention is the provision of a new and improved pressure modulating valve of the above mentioned type which is simple in design, rugged in its construction, and inexpensive to manufacture.

Another object of the present invention is the provision of a new and improved master cylinder of the above mentioned type having a fluid displacement chamber whose outer end is closed off by means of a valve control member which modulates a pressure flow therethrough, upon a slight inward movement; and which on further inward movement of the control member, causes it to abut an annular piston to cause it to displace fluid from the inner end of the fluid displacement chamber.

A still further object of the present invention is the provision of a new and improved hydraulic control valve having a fluid displacement chamber into which the valve's control member projects, and into which the output pressure of the control valve is communicated to provide a reaction pressure against the control member— the control valve further including an annular piston abutted by the control member during further inward movement to produce a manual displacement of fluid from the control valve structure.

The invention resides in certain constructions, and combinations, and arrangements of parts; and further objects and advantages of the present invention will become apparent to those skilled in the art to which it relates from the following description of the preferred embodiment described with reference to the accompanying drawing forming a part of the specification, and in which:

The solitary figure of the drawing schematically illustrates an automotive hydraulic braking system which incorporates a power operated master cylinder embodying principles of the present invention, and which is shown in cross section.

The hydraulic power braking system shown in the drawing generally comprises a gear pump 10 which receives fluid from a low pressure reservoir 12, and discharges the same through a check valve 14 to an accumulator 16. The pressure in the accumulator 16 is maintained within predetermined pressure limits by means of a charging valve 18 which, after the pressure in accumulator 16 reaches a predetermined pressure, unloads the pump 10 through the interconnecting lines 20 and 22 to the reservoir 12. A pressure sensing line 24 communicates pressure from the accumulator 16 to the charging valve 18 to control the operation of the charging valve. When the pressure in accumulator 16 falls below a predetermined lower limit, the charging valve 18 closes off communication from the pump 10 to the reservoir 12 through the interconnecting lines 20 and 22 so that the discharge from the pump 10 flows through the check valve 14 to build up pressure in the accumulator 16.

The hydraulic braking system shown in the drawing further includes a plurality of foundation brakes 26 only one of each of which are actuated by means of a hydraulic wheel cylinder 28. Actuation of the brakes 26 is produced by communicating pressure to the wheel cylinders 28 to force pistons in their opposite ends, outwardly to in turn force the brake shoes 30 in engagement with the revolving brake drum 32. Pressure from the accumulator 16 is modulated and delivered to the wheel cylinders 26 to produce and control a brake actuation by means of the pressure regulating valve A about to be described.

The pressure regulating valve A generally comprises a housing 36 having a forwardly and rearwardly extending fluid displacement chamber 38 therein. The rear end of the fluid displacement chamber 38 is closed off by means of a control member 40 having suitable seals with respect to the sidewalls of the fluid displacement chamber; and the forward end of the displacement chamber 38 is suitably closed off by an end wall 46 to provide a fluid pressurizing chamber 48 between the wall 46 and the forward end of the control member 40. The fluid pressurizing chamber 48 may be sized larger or smaller than the rear portion of the chamber 38 in which the control member 40 is positioned, and as shown in the drawing is made larger for reasons which will later be apparent.

The forward end of the displacement chamber 38 is enlarged or counterbored to provide the pressurizing section 48, and to further provide a shoulder 50 which acts as a stop for limiting rearward motion of an annular piston 52. The shoulder 50 maintains the annular piston 52 forwardly of the control member 40 by an amount which permits the normal pressure regulating movement of the control member 40. A suitable seal 54 is provided on the periphery of the annular piston 52 so that it can displace fluid from the pressurizing section 48. The annular piston 52 is normally held against the shoulder 50 by means of a coil spring 56 positioned between the annular piston 52 and the end wall 46. The control member 40 is biased rearwardly in the displacement chamber 38 by means of a coil spring 58 which is positioned between the end wall 46 and a suitable projection 60 which extends through the central opening 62 of the annular piston 52. A suitable stop or snap ring 64 is provided in the rear end of the chamber 38 to limit rearward movement of the control member 40, and provide the normal retracted position of the control member 40.

According to principles of the present invention, pressure flow from the accumulator 16 is controlled or modulated to the wheel cylinder 28. As the control member 40 is moved a small distance forwardly from the normal retracted position shown in the drawings, control member 40 is moved forwardly by a ball ended push rod 66; and the construction is such that only approximately a quarter of an inch of forward movement is required of the control member 40 to actuate the brakes when pressure is available in the accumulator 16. As previously indicated, the construction shown in the drawing is provided with an annular fluid displacement piston 52 which can be driven forwardly by the push rod 66 to actuate the brakes manually when insufficient pressure exists in the accumulator 16. Forward movement of the control member 40 bleeds pressure to the control port 68 of the valve structure, from whence it flows both to the hydraulic distribution line 34, and interconnecting passages 70 and 72 in the housing 36 to the fluid pressurizing chamber 48. Pressure in the chamber 48 is of course communicated to the control member 40 to provide a reaction force which opposes actuating movement of the control rod 66 by an amount which is proportional to the pressure which is being delivered to the wheel cylinders 28. By means of the arrangement shown in the drawing, one chamber 48 serves both as a reaction chamber for producing a reaction upon the control member 40, and also as a fluid displacement chamber from which fluid can be displaced manually during a pressure failure in the accumulator 16.

The control valve structure may be of any suitable type, as for example, the poppet type, or the slide valve type; and may be made to communicate pressure to the wheel cylinders 28 and fluid displacement chamber 48 prior to the time that the control member 40 engages the annular piston 52, or may be made to engage the annular piston 52 prior to the time that pressure is communicated to the wheel cylinders 28. In the construction shown in the drawing, the exhaust port 74 of the valve structure is positioned rearwardly of the annular piston 52, and is adapted to be closed off by the control member 40 as the control member 40 moves forwardly from the retracted position shown in the drawing. Pressure flow to the control port 68 is controlled by the land portion 76 shown by the solid lines in the drawing, and will cause the control port 68 to be opened to pressure prior to the time that the end surface of the control member 40 abuts the annular piston 52. With this arrangement, the brakes are normally operated by pressure from the accumulator 16 without moving the annular piston 52 so that the reaction pressure that opposes valve actuating movement is only that developed by the small forward end of the control member 40.

Normal operation of the construction just described therefore is initiated by forward movement of the push rod 66 which causes the forward end of the control member 40 to close off the exhaust port 74, and thereafter communicate pressure from the pressure port 78 to the control port 68 to simultaneously pressurize the wheel cylinders 28 and the fluid pressurizing chamber 48. Inasmuch as the forward end of the control member 40 will at this time not have engaged the end of the piston 52, the smaller end of the control member 40 provides a reaction force which opposes the actuating movement of the control valve structure. If a lack of pressure exists in accumulator 16, no reaction pressure will be produced to oppose the actuating movement of the control member 40 so that it sequentially closes the exhaust port 74, opens the control port 68 without actuating the brakes. Thereafter the forward end of the control member 40 abuts the annular piston 52 to displace fluid out of the fluid displacement chamber 48 to the wheel cylinders 28.

In order that the pressure generated in the fluid displacement chamber 48 will not flow backwardly to the accumulator, a suitable check valve structure 80 must be provided somewhere between the juncture of the interconnecting passage 70 and the accumulator 16. This is conveniently accomplished in the embodiment shown in the drawing by means of a seat 82 formed by means of the counterbore in the control ports 68, and a suitable ball valve 84 is biased against the seat by means of a coil spring 86. The coil spring 86 may be held in position in any suitable manner, and as shown in the drawing, is held by means of a conventional tubing ferrule that is used to connect the distribution line 34 to the housing 36. A slight amount of leakage may be experienced in the slide valve construction used to close the exhaust port 74; and accordingly, a suitable rubber seal 88 is provided in the end of the control member 40 to prevent all flow through the central opening 62 of the annular piston 52, when the end of the control member 40 abuts the annular piston 52 to displace fluid out of the pressurizing chamber 48.

When it is desired to release the annual application of the brakes, rearward movement of the control rod 66 allows the annular piston 52 to be retracted, and thereby reduce the pressure in the wheel cylinders 28. This continues until the annular piston 52 abuts the shoulder 50; whereupon continued rearward movement of the control member 40 opens up its central opening 62, and thereafter opens the exhaust port 74 to completely bleed pressure out of the wheel cylinders 28, and the fluid displacement chamber 48.

In some instances it may be desirable to produce a larger reaction force upon the control member 40 and this can be easily accomplished by causing the end of the control member 40 to abut the annular piston 52 prior to the time that the land 76 allows pressure to be communicated to the control port 68. This is simply accomplished by extending the land portion 76 to the position shown by the dash-dot line 90. With this arrangement, the annular piston 52 will be moved out of engagement with its shoulder 50 prior to the time that pressure is communicated to the wheel cylinders 28, and the fluid displacing chamber 48 so that the reaction that is exerted upon the control member 40 is that produced by the larger diameter of the annular piston 52. With this arrangement the control member 40 need not close off the exhaust port 74 prior to engagement with the annular piston 52. Immediately following separation of the annular piston 52 from the shoulder 50, the rear face 90 of the land 76 opens communication with the control port 68 to actuate the brakes. With this construction very little pressure flow is required of the hydraulic pump 10 inasmuch as some of the displacement is always delivered manually. Further advantage occurs by reason of this construction in that no lost motion is involved in the transition from pressure actuation to manual actuation; inasmuch as the annular piston 52 is being moved at all times, and the check valve structure 80 automatically closes when the manually developed pressure exceeds that supplied by the accumulator 16. The operation of this embodiment is believed to be otherwise similar to that previously recited so that it will be readily apparent to those skilled in the art, and need not further be elaborated upon.

It will be apparent that the objects heretofore enumerated as well as others have been accomplished; and that there has been provided a new and improved piston arrangement whereby a single fluid pressurizing cylinder provides both a reaction force, and a fluid displacement chamber which can be operated manually by the continued forward motion of the control member.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a fluid pressure device: a housing having a forwardly and rearwardly extending fluid pressure chamber; a piston in said chamber; stop means preventing rearward movement of said piston beyond a retracted position; said housing having an exhaust port communicating with said chamber adjacent said piston; a control member having a normal position in said chamber rearwardly of said piston; said control member when in said normal position establishing communication between said exhaust port and said chamber forwardly of said piston, and closing off communication upon forward motion from said normal position, and thereafter moving said piston out of engagement with said stop means; said housing also having a pressure supply port, and a control port communicated by a passage with said chamber forwardly of said piston; and valve means which communicates said pressure port with said chamber forwardly of said piston upon forward movement of said control member after said piston moves out of engagement with said stop means.

2. In a fluid pressure device: a housing having a forwardly and rearwardly extending fluid pressure chamber; an annular piston in said chamber; stop means preventing rearward movement of said annular piston beyond a retracted position; said annular piston having a valve seat surrounding its central opening and facing in a rearward direction; said housing having an exhaust port communicating with said chamber rearwardly of said valve seat; a control member having a normal position in said chamber rearwardly of said annular piston; said control member establishing communication between said exhaust port and said valve seat in its normal position, and closing off said valve seat upon forward motion from said normal position, and thereafter moving said annular piston out of engagement with said stop means; said housing also having a pressure supply port, and a control port which communicates with said chamber forwardly of said annular piston; and valve means which communicates said pressure port with said chamber forwardly of said annular piston upon forward movement of said control member after said annular piston moves out of engagement with said stop means.

3. In a fluid pressure device: a housing having a forwardly and rearwardly extending fluid pressure chamber; an annular piston in said chamber; stop means preventing rearward movement of said annular piston beyond a retracted position; a control member having a normal position in said chamber rearwardly of said annular piston; the portion of said chamber forwardly of said annular piston and said control member forming a fluid displacement chamber whose pressure exerts a rearward force on said annular piston and control member; said control member being adapted to abut and drive said annular piston forwardly; said housing having a control port communicating with said fluid displacement chamber; means providing a pressure inlet port; means providing an exhaust port; and valve means normally communicating said exhaust port to said fluid displacement chamber in said normal position of said control member, said control member being operatively connected to said valve means to gradually close off said exhaust port and gradually open said pressure port to said fluid displacement chamber upon forward motion of said control member prior to its abutment with annular piston; whereby a small reaction is provided during normal valve control movement, and continued forward movement of said control member causes said annular piston to displace fluid from said chamber.

No references cited.